United States Patent
Zaslavsky et al.

(10) Patent No.: US 9,430,257 B2
(45) Date of Patent: Aug. 30, 2016

(54) SCHEDULING VIRTUAL MACHINES USING USER-DEFINED RULES

(71) Applicant: Red Hat Israel, Ltd., Raanana (IL)

(72) Inventors: Yair Zaslavsky, Netanya (IL); Doron Fediuck, Raanana (IL); Laszlo Hornyak, Raanana (IL)

(73) Assignee: Red Hat Israel, Inc., Raanana (IL)

( * ) Notice: Subject to any disclaimer, the term of this patent is extended or adjusted under 35 U.S.C. 154(b) by 525 days.

(21) Appl. No.: 13/733,689

(22) Filed: Jan. 3, 2013

(65) Prior Publication Data

US 2014/0189684 A1    Jul. 3, 2014

(51) Int. Cl.
| | |
|---|---|
| *G06F 9/46* | (2006.01) |
| *G06F 9/455* | (2006.01) |
| *G06F 9/445* | (2006.01) |
| *G06F 9/50* | (2006.01) |

(52) U.S. Cl.
CPC ............. *G06F 9/45533* (2013.01); *G06F 8/61* (2013.01); *G06F 9/5027* (2013.01); *G06F 2009/4557* (2013.01); *G06F 2209/506* (2013.01)

(58) Field of Classification Search
CPC ..................... G06F 2009/4557; G06F 9/4856; G06F 11/3409; G06F 9/5044; G06F 9/505
See application file for complete search history.

(56) References Cited

U.S. PATENT DOCUMENTS

| | | | |
|---|---|---|---|
| 8,533,711 B2* | 9/2013 | Heim ................................ 718/1 |
| 8,739,157 B2* | 5/2014 | Ho et al. ........................... 718/1 |
| 8,850,442 B2* | 9/2014 | Davis et al. ................... 718/104 |
| 2003/0084056 A1* | 5/2003 | DeAnna et al. .............. 707/100 |
| 2010/0191845 A1* | 7/2010 | Ginzton ......................... 709/224 |
| 2010/0269109 A1* | 10/2010 | Cartales ............................ 718/1 |
| 2011/0131571 A1* | 6/2011 | Heim .................. G06F 9/45558 718/1 |
| 2012/0204176 A1* | 8/2012 | Tian et al. ......................... 718/1 |
| 2013/0055239 A1* | 2/2013 | Anderson et al. ................ 718/1 |

OTHER PUBLICATIONS

Galan et al. ("Service Specification in Cloud Environments Based on Extensions to Open Standards", published in: COMSWARE '09 Proceedings of the Fourth International ICST Conference on Communication System software and middleware, Article No. 19, Conference held Jun. 16-19, 2009).*

* cited by examiner

*Primary Examiner* — Wissam Rashid
(74) *Attorney, Agent, or Firm* — Lowenstein Sandler LLP (57) ABSTRACT

A processing device receives a rule for execution by a rules engine and provides the rule to the rules engine. The processing device receives a request to provision a virtual machine (VM) having VM attributes. The processing device provides metrics of a plurality of physical hosts to the rules engine and the VM attributes to the rules engine. The processing device then receives. from the rules engine, an identification of one or more prioritized physical hosts of the plurality of physical hosts. The processing device provisions the VM on one of the one or more prioritized physical hosts.

20 Claims, 5 Drawing Sheets

SCHEDULING VIRTUAL MACHINES USING USER-DEFINED RULES

TECHNICAL FIELD

Embodiments of the disclosure relate generally to software provisioning and, more specifically, relate to a mechanism for provisioning a virtual machine using a rules-based engine.

BACKGROUND

Distributed computing includes the use of computing resources (hardware and software) that are delivered as a service over a network (typically the Internet), often referred to as "cloud computing." In a distributed computing environment, a customer pays a "cloud provider" to obtain control of a virtual machine, which may be implemented as a program executing on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, memory, storage, and network services, etc., as well as an interface a customer can use to install and execute the customer's program on the virtual machines that the customer requisitions, together with additional software on which the customer's program depends.

The interface provided by the cloud provider communicates with a virtualization manager that manages the computer hardware that provides the virtual environments used by end users of the virtual machines. The virtualization manager, via built-in and hard-coded algorithms, determines where to launch a virtual machine requested by the customer. However, cloud providers (who may be customers of virtualization management solutions) typically have little input regarding the algorithms that determine where a virtual machine is provisioned. If a cloud provider administrator wants to modify the algorithms that determine where to provision a virtual machine, code changes of the virtualization manager is typically performed.

BRIEF DESCRIPTION OF THE DRAWINGS

Embodiments of the disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for deploying a virtual machine on a physical host by utilizing the decision making efficiency of a business rule engine to process rules such as user-defined rules that are defined by an administrator of a virtualization system. In embodiments of the disclosure, a cloud provider administrator writes his own business rules for VM scheduling into a rules language file. Alternatively, the administrator may install a sample rules file provided by a virtualization manager manufacturer. When the rules engine starts, it may read the rules file and add it to its internal execution policy. Alternatively, the rules engine may receive rules from virtualization management. The virtualization manager, as a part of its functionality, monitors the current status of all physical hosts in the virtualization system, and collects the status information into a data structure (e.g., a database). The virtualization manager is asked by an end user to run a virtual-machine. In order to determine which physical host will be used, the virtualization manager provides the rules engine a set of virtual machine (VM) attributes (e.g., specified resources such as CPU, memory, etc), as well as current known status for all relevant physical hosts. The rules engine processes the internal policy based on the given information and the rules (e.g., the user-defined rules), and returns to the virtualization manager one or more prioritized physical hosts capable of running the given VM. As a result, the computer system provisions a virtual machine on the selected physical host.

One advantage of using such a system is the ability to implement user-defined rules to provision virtual machines, which are otherwise provisioned according to hard-coded algorithms in a virtual machine manager. Another advantage is that the cloud provider can fine-tune applied rules without making any code changes to the virtualization manager to optimize the system whenever a new software version or new hardware is introduced.

Figure 1:
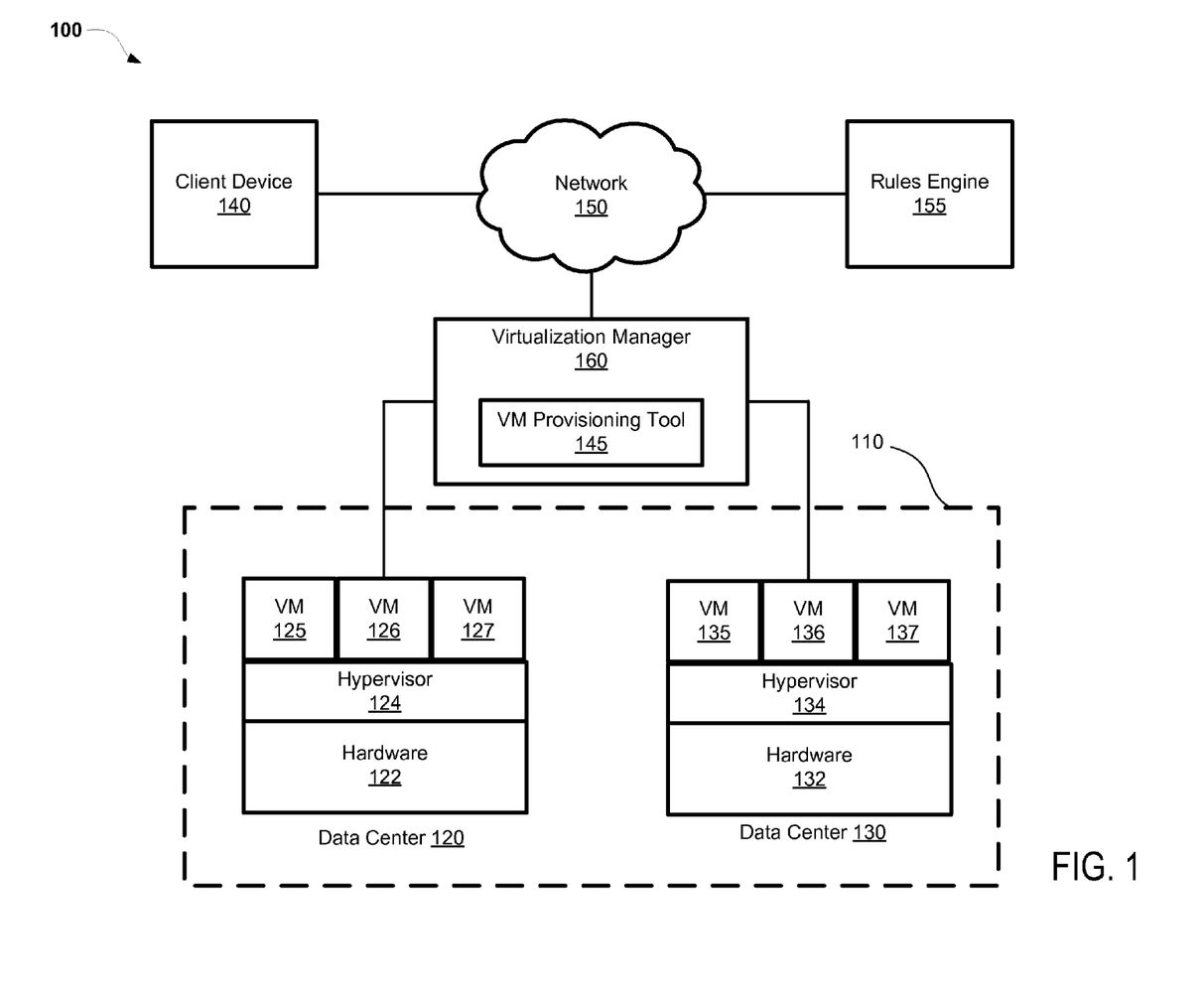
FIG. 1 is a block diagram of a network environment for implementing a virtualization manager according to one embodiment of the present disclosure.

FIG. 1 is a block diagram of a network architecture 100, in which embodiments of the disclosure may operate. The network architecture 100 includes a virtualization infrastructure 110 of an organization that spans multiple data centers. For simplicity, only two data centers are shown. Data center 120 may be located in one geographic area (for example Europe) and data center 130 may be located in another geographic area (for example East Coast USA).

Data center 120 includes various hardware resources 122, such as physical servers and various processing and communications resources. The virtualization infrastructure 110 can include various servers and controllers not shown for simplicity (such as a distributed resource (e.g., cloud) controller, a provisioning server, etc) that enable the virtualization infrastructure 110 to deploy a hypervisor 124 on one or more of the hardware resources 122 and to deploy virtual machines 125-127 using the hypervisor 124 (also known as a virtual machine monitor (VMM)).

In one embodiment, hypervisor 124 is a set of configurations and software components of a host operating system (OS). The hypervisor 124, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 124 presents to other software (i.e., "guest" software) the abstraction of one or more virtual machines (VMs).

Data center 130 can be implemented in a manner similar to data center 120. For example, data center 130 may include one or more hypervisors 134 running on hardware resources 132. Such hardware resources 132 may represent hardware resources of multiple host machines arranged in a cluster. Each hypervisor may manage zero or more virtual machines. For example, hypervisor 134 may deploy and manage virtual machines 135, 136, 137.

The virtualization infrastructure 110 can be used to provide various composite services (also known as composite applications). A composite application is an application that is installed on multiple machines (e.g., on multiple virtual machines). In the case of virtual machines, the virtual machines may all run on the same data center 120, 130, or may run on different data centers at different geographic locations. Each component of the application may be installed on a virtual machine optimized for the component.

In one embodiment, a single component of the composite application is part of a virtual appliance. A virtual appliance may be a virtual machine image file that includes a preconfigured operating system environment and a single application (e.g., a component of the composite application). The virtual appliance may simplify the delivery, setup and operation of that single application. The virtual appliance may be a subset of a virtual machine. Virtual appliances may be used for deploying network applications, such as firewalls, virtual private networks, wide area network (WAN) optimizers, web servers, application servers, database management systems, and so forth.

The composite application and its components may be made up of several software "applications," so the composite application will sometimes be referred to as a composite service. For example, a composite application or service can be a Web application, such as a news site, a social networking site, or a blog site. Such a composite application can have various components. For example, a 3-tier application will have an interface tier (Web server), a business logic tier (application server) and a data tier (database management system). Various other tiers are possible, including an orchestration tier to distribute and manage jobs between multiple servers.

For example, a composite service may consist of a database server hosted—in data center 120—on virtual machine 125, an application server hosted on virtual machine 126, and a web server hosted on virtual machine 127. In data center 130, another application server for the composite service can be hosted on virtual machine 135 and another web server for the composite service can be hosted on virtual machine 136. In another example, data center 120 may host a virtual appliance associated with a composite application (e.g., an application server of the composite application), and data center 130 may host a second virtual appliance associated with the composite application (e.g., a web server of the composite application).

In one embodiment, a client 140 is connected to the virtualization infrastructure—and ultimately to the virtual machines—via a network 150, which may be may be a private network (e.g., a local area network (LAN), a wide area network (WAN), intranet, or other similar private networks) or a public network (e.g., the Internet). The client 140 may be a mobile device, a PDA, a laptop, a desktop computer, or any other computing device.

In one embodiment, the virtualization infrastructure 110 also includes, or in the alternative communicates with, a virtualization manager 160. The virtualization manager 160 monitors operating parameters of the data centers 120, 130, including performance metrics of each individual physical host executing as part of the data centers 120, 130. Examples of operating parameters for the data center can include, but are not limited to, number of host machines, total number of processing cores, network bandwidth capability, power usage, reliability (e.g., uptime), storage capacity, etc. The operating parameters may also include current status information about the hosts, such as current available bandwidth, latency, available resources (e.g., disk space, memory, processing resources, etc.), and so forth. As part of maintaining the operating parameters of the data centers, the virtualization manager 160 is also configured to maintain the performance metrics of each host, which may include, but is not limited to, number of physical processors, RAM capacity, physical storage capacity, number of virtual processors, virtual RAM capacity, virtual storage capacity, quantity and type of physical and virtual network interfaces, number of virtual machines currently executing on the host, and processor and memory usage by the virtual machines.

The virtualization manager 160, in one embodiment, includes a virtual machine provisioning tool 145. The virtual machine provisioning tool 145 is configured to manage the provisioning, migration, and/or termination of virtual machines across the virtualization infrastructure 110. The virtual machine provisioning tool 145 tracks virtual machine usage statistics across the virtualization infrastructure 110 to identify maintenance issues to perform. For example, the virtual machine provisioning tool 145 may utilize the statistics to determine that a virtual machine (e.g., VM 126) may beneficially be migrated from one data center 120 to another data center 130. This decision may be based on access statistics associated with client access. Access statistics can include historic, recent, and trending location of accesses. Some example access statistics can be: total accesses per region per timeframe, traffic change per region per timeframe, and other such statistics.

The virtual machine provisioning tool 145 is configured to communicate with a rules engine 155 to determine an optimal location (e.g., identify a specific host in a specific data center 120, 130) to which to deploy components of a composite application or virtual machine using the collected and/or computed statistics. In one embodiment, the virtualization manager 160 is networked to the rules engine 155 (as shown). Alternatively, the rules engine 155 and virtualization manager 160 may both operate on the same host. In one embodiment, the rules engine 155 is a module of virtualization manager 160. The virtual machine provisioning tool 145 may communicate the statistics (e.g., both data center and individual host machine statistics) with the rules engine 155. The virtual machine provisioning tool also provides to the rules engine a VM to be scheduled. Additionally, the virtual machine provisioning tool 145 may bundle the statistics together with a reference to a specific policy or set of rules the rules-engine 155 is to apply.

The rules-engine 155 may use a given reference to rules or any internal preloaded rules or rules updated by the system administrator to determine a physical host to provision the scheduled VM on. Business rules may be provided to the rules engine 155 as a rules language file. Examples of a rules language file include, but are not limited to, a Drools Rules Language file, an Extensible Markup Language file, a Business Rules Markup Language file, a C Language Integrated Production System file, an ILOG file, a Jess file, a Prolog file, a Lisp-based Intelligent Software Agents file, a Decision Table base Rules file, and an OpenL Tablets file. Rules files may include user-defined rules that are generated based on input from an administrator.

The rules engine 155 is configured to evaluate rules and executes one or more rules according to the evaluation. A rule is a logical construct for describing operations, definitions, conditions, and/or constraints that apply to some predetermined data to achieve a goal. For example, a business rule might state that no credit check is to be performed on returning customers.

The rules engine includes a suite of components (described in greater detail below with reference to FIG. 2) that manages and automates the rules to implement. Rules may be written in rule languages. Examples of rule languages suitable for use in the present disclosure include, but are not limited to, C Library Integrated Production System (CLIPS) language, Extensible Markup Language (XML), ILOG Rule Language (IRL), and Drool's Rule Language (DRL), etc. Similarly, the rules engine 155 may be implemented using many different rules engines including, but not limited to, CLIPS, JRules, Drools, etc.

In one embodiment, a rule is in the form of a two-part structure with a Left Hand Side (LHS) and a Right Hand Side (RHS). The LHS of the rule refers to conditions that must be met before any actions (e.g., the RHS) are executed. A rule may also have additional attributes, such as salience (a form of priority where rules with higher salience are prioritized over rules with lower salience), agenda group (a form of rule grouping to ensure only rules in the agenda are allowed to execute), auto-focus (allowing a rule to execute despite not being grouped in an agenda group), activation group (a setting to define whether a secondary rule is executed following the execution of a primary rule), no-loop (a setting to prevent iterative execution of the rule), duration (a setting to dictate a time duration before executing a rule), etc. In some embodiments, the LHS of a rule includes conditional elements and patterns. The term "pattern" indicates constraints on fact types, for example, a pattern may limit input to the LHS to integers and/or text.

As facts are asserted and modified in a working memory, the rules engine 155 matches the facts (e.g., virtualization infrastructure 110 statistics) against the LHS conditions of the rules. The rules engine 155 asserts the facts against the rule and, in one embodiment, executes the RHS (e.g., consequences). The rules engine 155 returns the result of the rule, which in one embodiment is an identified host upon which the virtual machine provisioning tool 145 may provision a virtual machine.

In this manner, the virtual machine provisioning tool 145 may dynamically deploy (or move) entire components of a composite service or virtual machine to locations where they are needed and/or where the resources will most efficiently be executed. The virtual machine provisioning tool 145 is also configured to instruct a host to perform provisioning by copying an application to the host, booting the application, and so forth. This may also include performing a live migration of a virtual machine that includes the application (e.g., of a virtual appliance) or composite application.

As mentioned above, the virtualization manager 160 maintains information on characteristics of virtual environments and underlying hardware and software in those virtual environments that it interacts with. This may include information on underlying hardware (e.g., processor resources, memory resources, etc.), information on a host operating system, information on a hypervisor, information on virtual machines, and so forth. Each virtual machine or component of a composite application (e.g., each virtual appliance) may specify configuration parameters, such as minimum resources, a type of hypervisor that it will function on, and so forth by recording this information in a virtual machine configuration file.

As discussed above, virtualization manager 160 may interact with a virtual environment that spans multiple different data centers 120, 130, and may additionally interact with multiple different virtualization environments, for example, the virtualization manager 160 may interact with a first virtualization environment that uses an underlying hypervisor provided by VMWare®, and with a second virtualization environment that uses an underlying hypervisor provided by Red Hat®. The virtualization manager 160 maintains information on the underlying software and hardware in each such virtualization environment.

While various embodiments are described in terms of the environment described above, the facilities and systems may be implemented in a variety of other environments and combinations. For example, the virtual machine provisioning tool 145 or the rules engine 155 itself may be hosted by a virtual machine of the virtualization infrastructure 110.

Figure 2:
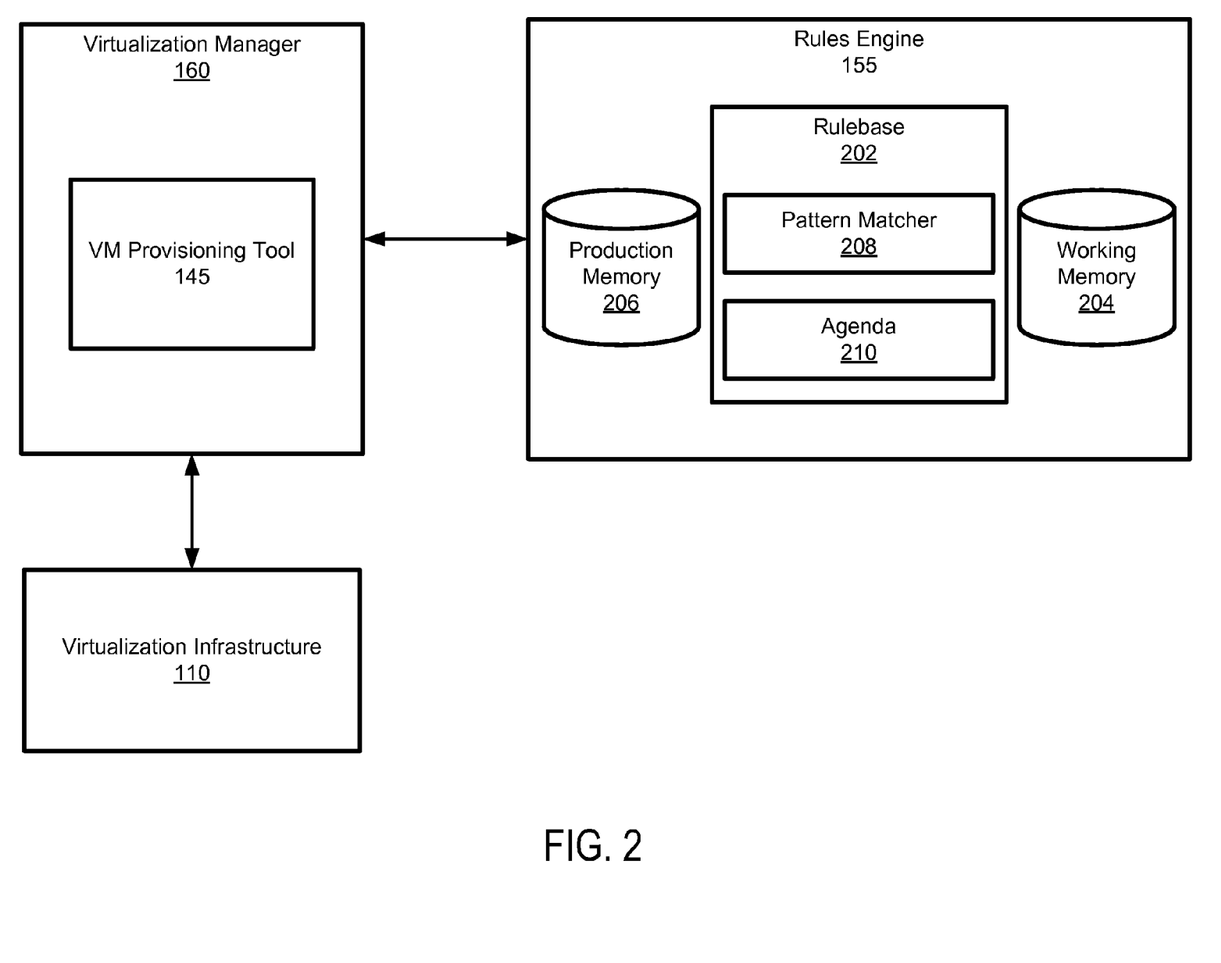
FIG. 2 is a block diagram illustrating a virtual machine provisioning tool and a rules engine in more detail according to an embodiment of the disclosure

FIG. 2 is a block diagram illustrating a virtual machine provisioning tool 145 and a rules engine 155 in more detail according to an embodiment of the disclosure. The rules engine 155 has an internal rule-base, which can be modified by the virtual machine provisioning tool 145 or using its own interfaces such as a web interface. The Virtualization Manager 160 may provide facilities for cloud provider administrators to update existing rule files, or add new files, and then update the rules engine with these rules. Examples of a rule language include, but are not limited to, Drools, XML, and IRL. One example of a sample business rule might state: "After the hours of 6 PM ET, select a VM host from data center 120, where the VM host has no more than two currently executing virtual machines."

The virtualization manager 160, in one embodiment, is configured to provide a user interface to the client device 140 to receive a custom rule from an administrator of the virtualization system. For example, an administrator may upload a rule to the virtualization manager 160 via a file transfer initiated on a website. In another embodiment, the virtualization manager 160 provides a user interface for modifying a plurality of sample rules.

In a further embodiment, the virtualization manager 160 interfaces with the virtualization infrastructure to collect statistics as described above. The virtual machine provisioning tool 145 is configured to communicate the statistics and/or the custom rule or the sample rule to the rules engine 155. In some embodiments, the rules are maintained on a machine-readable storage medium accessible by both the virtualization manager 160 and the rules engine 155.

The rules engine 155 has two main parts, namely authoring and runtime. Authoring involves the pre-processing of rule files to generate packages, which are loaded into a runtime of the rule engine. A package is a collection of rules and other components associated with the rules, such as imports (e.g., classes to import), and globals (e.g., global variables). The runtime of the rule engine is also referred to as a rulebase 202. Stated differently, the rulebase 202 is the runtime representation of a rule set. The rule set may include a custom rule received from an administrator via the virtualization manager 160, or a set of sample rules provided with the virtualization manager 160.

The rules engine 155, in one embodiment, includes a working memory 204. The working memory 204 is the main class for using the rule engine at runtime. The working memory 204 may hold references to data (e.g., statistics about the virtualization infrastructure 110). The rules engine 155 also includes production memory 206 which maintains the rules, in one embodiment. The statistics maintained in the working memory 204 are accessible by the rules engine 155 and asserted against the rules of the production memory 206.

The rules engine 155 may be scalable to a large number of rules and statistics or facts. The rulebase 202, in one embodiment, includes a pattern matcher 208 and an agenda 210. The pattern matcher 208 matches the statistics against the rules to infer conclusions. In one embodiment, the conclusion is an identified host upon which the virtual machine provisioning tool 145 may provision a virtual machine. In other words, when the LHS conditions of a rule are satisfied by the facts or statistics, the RHS is activated and placed onto the agenda 210 to be executed. For example, if a LHS has a condition that states "on even days of the month, new virtual machines are to be provisioned on a physical host located in New York," and the day of the month condition is met, the rules engine will place the rule onto the agenda 210 to be executed. If no other rules have priority, the rules engine 155 executes the rule and returns the response (e.g., a physical host in New York) to the virtualization manager 160. In one embodiment, the rules engine 155 applies the facts (e.g., statistics of the virtualization infrastructure) to the rule and returns an identified physical host to the virtualization manager 160.

Figure 3A:
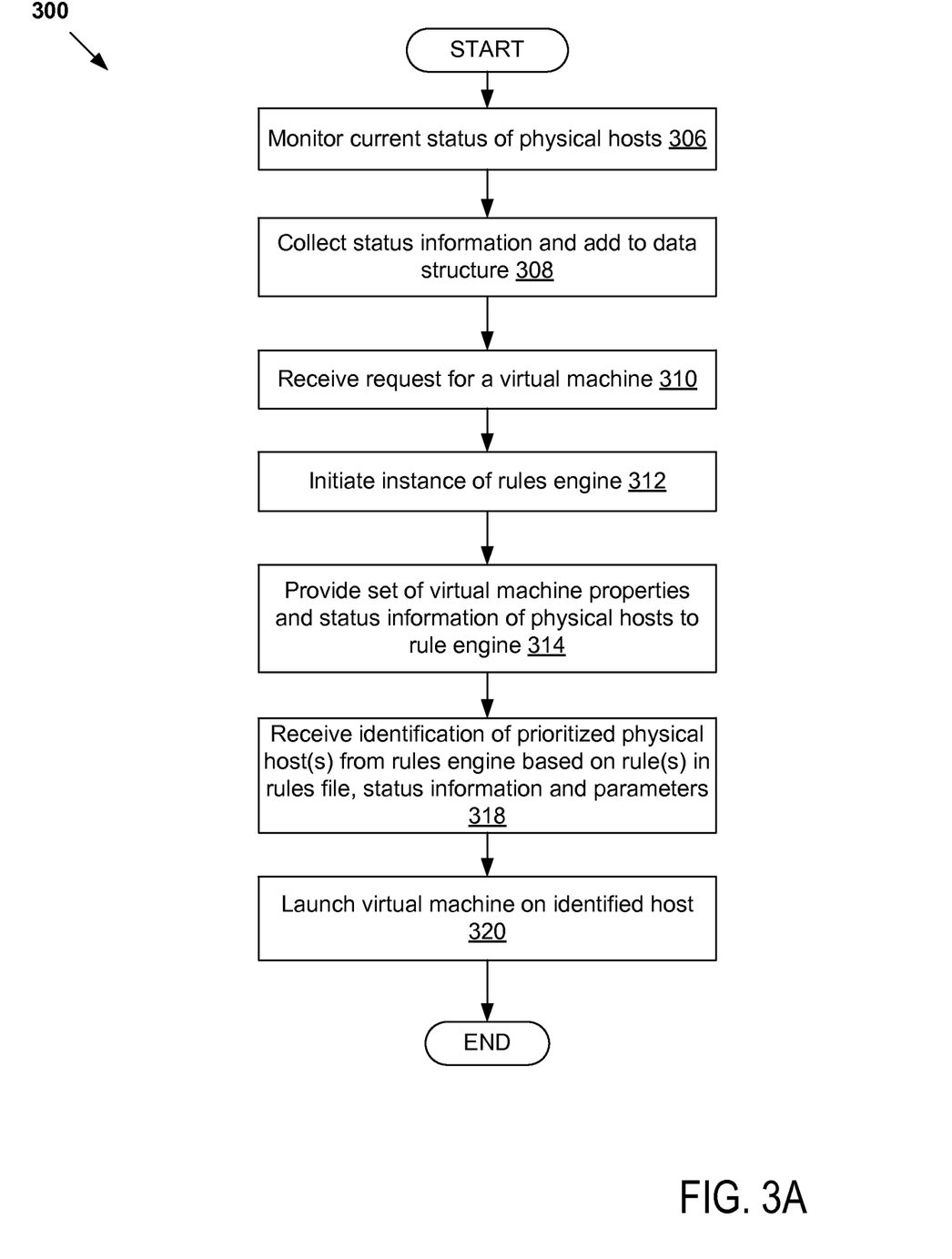
FIG. 3A is a flow diagram illustrating a method for deploying a virtual machine using a rules-based engine.

FIG. 3A is a flow diagram illustrating a method 300 for deploying a virtual machine using a rules-based engine. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the virtualization manager 160 of FIG. 1.

At block 306 of method 300, the processing logic monitors a current status of multiple physical hosts. The current status information may include number of virtual machines hosted by those physical hosts, available resources on those physical hosts, location of the hosts, bandwidth available to the hosts, and so forth. In one embodiment, the processing logic receives the parameters by either collecting virtualization infrastructure statistics, or collecting the statistics from the data centers (e.g., data center 120, 130 of FIG. 1). Examples of statistics include, but are not limited to memory in use, free memory, memory sharing capabilities, CPU usage, available CPU resources, CPU topology, guest CPU and memory statistics, network usage, storage usage, storage limitations, etc. At block 308, processing logic collects the status information of the hosts and adds the status information to a data structure such as a database or table.

At block 310, processing logic receives a request for a virtual machine. The request may specify a particular type of virtual machine (e.g., a virtual machine with a particular operating system installed, particular applicants installed, and so forth).

Responsive to the request, at block 312 processing logic initiates an instance of a rules engine. For example, the processing logic may provision the rules engine 155 as part of a virtual machine operating on a host in a data center (e.g., data center 120, 130 of FIG. 1). In an alternative embodiment, the processing logic may determine if an instance of the rules engine 155 is already executing and accessible by the virtual machine provisioning tool. For instance, the processing logic may determine if the rules engine 155 is accessible over a network as described above with reference to FIG. 1.

At block 314, processing logic determines virtual machine attributes associated with the requested virtual machine, and provides these virtual machine attributes to the rules engine. Additionally, processing logic provides the status information stored in the data structure to the rules engine.

At block 318, the rules engine executes one or more rules (e.g., user-defined rules) using the VM attributes and status information to determine one or more prioritized physical hosts for provisioning the virtual machine on. The executed rules may be those rules included in a rules file received from the provisioning manager. In one embodiment, the rules engine applies a rule having a rule identifier (ID) provided to the rules engine at block 314. Alternatively, processing logic may not specify any rules to use, and the rules engine may make a determination of one or more existing rules to apply. Once the rules engine determines one or more prioritized physical hosts, processing logic receives a response from the rules engine that indicates the prioritized host or hosts. A prioritized host may be a suitable host for provisioning, or scheduling, a virtual machine. The provisioning logic, at block 320, then provisions the virtual machine on the identified physical host.

In the above described method, the custom rules may be changed according to desired operating conditions of an administrator of the virtualization system. For example, an administrator may have at his or her disposal physical hosts located with different hosting providers. These different hosting providers might charge different rates (e.g., hourly, daily, or based on quantity of data transferred, or a combination of both) for hosting depending on a range of factors including, but not limited to, time of day, weekday vs. weekend, amount of data transferred, processor utilization of a VM host, etc. The administrator can customize the rules based on these, and other, conditions. Other conditions may include VM high-availability rules (also known as co-location rules), power saving rules, etc.

Beneficially, the above described devices and methods allow an administrator to change and customize rules according to a specific operating scenario. Additionally, an end user of the VM (e.g., a customer of the virtualization system or provider) may ask for specific characteristics from the provider. To accommodate such requests, a customer interface may include policy options for the consumer to choose from, such as selection of various pre-generated rules.

Figure 3B:
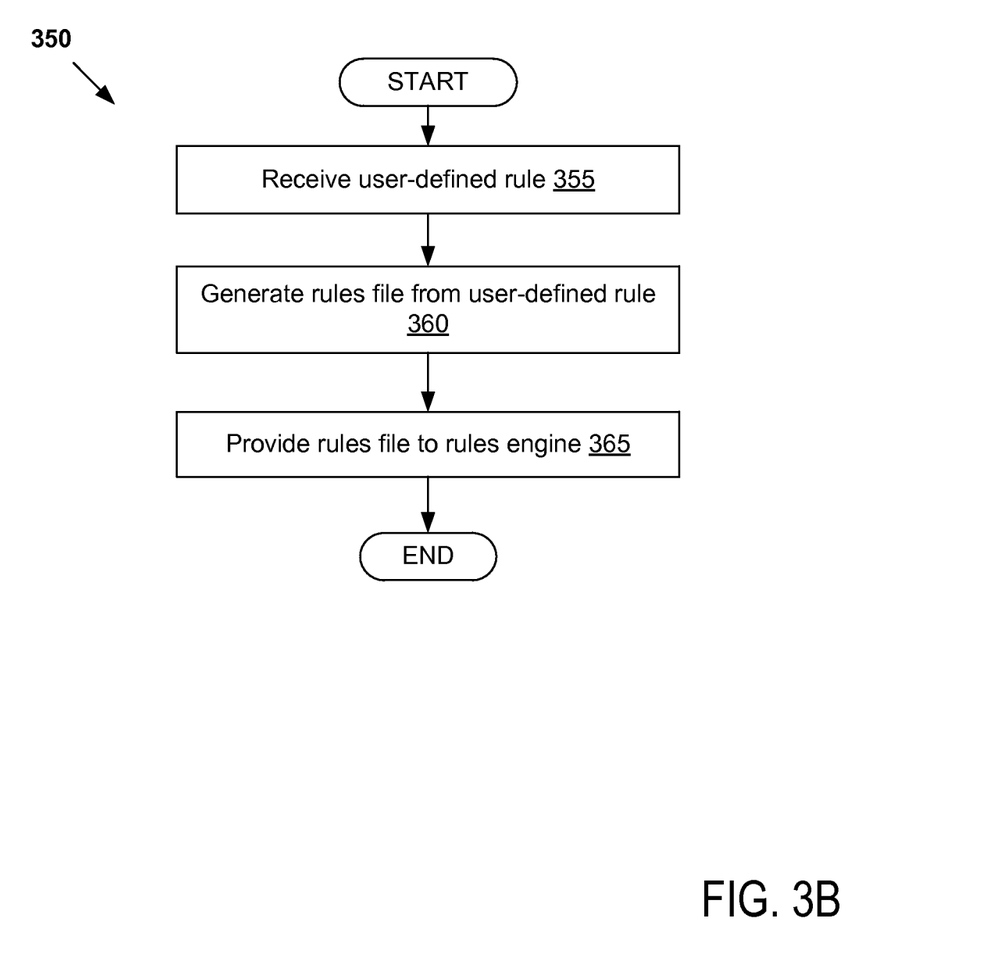
FIG. 3B is a flow diagram illustrating a method for providing a user-defined rule to a rules-based engine.

FIG. 3B is a flow diagram illustrating a method 350 for providing a user-defined rule to a rules-based engine. Method 350 may be performed by processing logic that may comprise hardware (e.g., circuitry, dedicated logic, programmable logic, microcode, etc.), software (such as instructions run on a processing device), firmware, or a combination thereof. In one embodiment, method 350 is performed by the virtualization manager 160 of FIG. 1.

At block 355, processing logic may receive a custom rule (or multiple custom rules) from an administrator. The processing logic, in one example, receives the rule via a communication interface. Alternatively, the processing logic accesses the custom rule from a computer-readable storage medium. For example, the processing logic may retrieve the custom rule from a shared network storage device.

In one embodiment, the processing logic provides sample rules to an administrator via a user interface. The processing logic may provide the sample rules by providing a user interface to the administrator which presents, or displays, the sample rules in a near human-readable format. For example, the processing logic may present the rules in a pseudo-code format, or alternatively, in the form of a conditional statement. One simple example of a sample rule, as provided by an administrator, is rule "Host is not in the right group"
when
>> vm: VM( )

```
>> host: HOST(host_group_id !=vm.gethost_group_id(
    ))
  then
    >> log.info("host is not in the right group:"+vds.getId( );
    >> retract(host);
```

The administrator may then select one or more of the sample rules for use. Alternatively, the administrator may modify one or more of the sample rules for use. Note that in some implementations, sample rules may also be provided to an end user, and the end user may select from among the one or more sample rules.

If any custom rules have been received, processing logic may generate a rules file from the user-defined custom rules at block 360. The rules file may include multiple custom rules. Alternatively, a separate rules file may be generated for each rule. At block 365, processing logic provide those custom rules to the rules engine in the form of the rules file.

Figure 4:
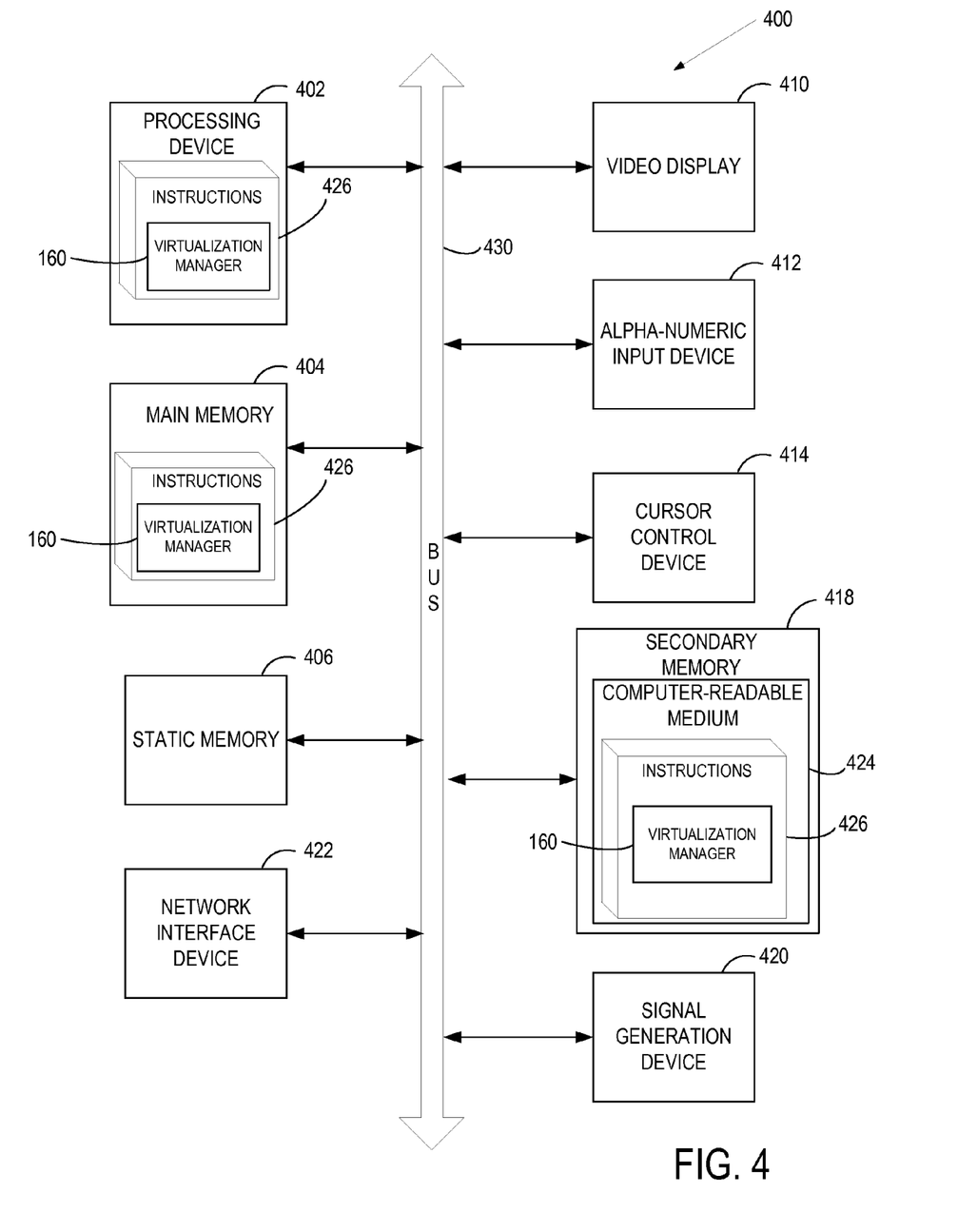
FIG. 4 is a diagram of one embodiment of a computer system for facilitating the provisioning of virtual machines.

FIG. 4 is a diagram of one embodiment of a computer system (e.g., a physical machine) for facilitating the provisioning of virtual machines. Within the computer system 400 is a set of instructions for causing the computer system to perform any one or more of the methodologies discussed herein. In alternative embodiments, the computer system may be connected (e.g., networked) to other machines in a LAN, an intranet, an extranet, or the Internet. The computer system can be a host in a cloud, a cloud provider system, a cloud controller or any other computing device. The computer system can operate in the capacity of a server or a client machine in a client-server network environment, or as a peer machine in a peer-to-peer (or distributed) network environment. The computer system may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that computer system. Further, while only a single physical machine is illustrated, the terms "computer system" and "physical machine" shall also be taken to include any collection of physical machines (e.g., computers) that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a secondary memory 418 (e.g., a data storage device in the form of a drive unit, which may include fixed or removable computer-readable storage medium), which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)) connected to the computer system through a graphics port and graphics chipset, an alphanumeric input device 412 (e.g., a keyboard), a cursor control device 414 (e.g., a mouse), and a signal generation device 420 (e.g., a speaker).

The secondary memory 418 may include a machine-readable storage medium (or more specifically a computer-readable storage medium) 424 on which is stored one or more sets of instructions 426 embodying any one or more of the methodologies or functions described herein. In one embodiment, the instructions 426 include instructions for the virtualization manager 160. The instructions 426 may also reside, completely or at least partially, within the main memory 404 and/or within the processing device 402 during execution thereof by the computer system 400, the main memory 404 and the processing device 402 also constituting machine-readable storage media.

The computer-readable storage medium 424 may also be used to store the instructions 426 persistently. While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The instructions 426, components and other features described herein can be implemented as discrete hardware components or integrated in the functionality of hardware components such as ASICS, FPGAs, DSPs or similar devices. In addition, the instructions 426 can be implemented as firmware or functional circuitry within hardware devices. Further, the instructions 426 can be implemented in any combination hardware devices and software components.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "identifying," "receiving," "retrieving," "provisioning," "identifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

In the preceding description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment. Like reference numbers signify like elements throughout the description of the figures.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, through a first interface, by a processing device, a rule for execution by a rules engine;
   providing, by the processing device, the rule to a virtualization manager;
   receiving a request to provision a virtual machine (VM) having VM attributes;
   determining, by the processing device, whether an instance of the rules engine is available;
   in response to determining that an instance of the rules engine is available, establishing communication between the available instance of the rules engine and the virtualization manager;
   in response to determining that no instance of the rules engine is available, initiating a new instance of the rules engine;
   providing, by the processing device, the rule to the rules engine from the virtualization manager;
   providing, by the processing device, metrics of a plurality of physical hosts to the rules engine and the VM attributes to the rules engine;
   receiving, from the rules engine, an identification of one or more prioritized physical hosts of the plurality of physical hosts; and
   provisioning, by the processing device, the VM on one of the one or more prioritized physical hosts.

2. The method of claim 1, wherein the received rule is a user-defined rule.

3. The method of claim 1, further comprising:
   generating a rules language file that incorporates the rule, wherein the rules language file is provided to the rules engine.

4. The method of claim 3, wherein the rules language file is at least one of a Drools Rules Language file, an Extensible Markup Language file, a Business Rules Markup Language file, a C Language Integrated Production System file, an ILOG file, a Jess file, a Prolog file, a Lisp-based Intelligent Software Agents file, a Decision Table base Rules file, and an OpenL Tablets file.

5. The method of claim 1, further comprising providing a plurality of sample rules to the virtualization manager via a user interface, each of the plurality of sample rules editable by an administrator of the virtualization manager.

6. The method of claim 1, wherein the rules engine is a business rules engine to execute the rule using the metrics and the VM attributes.

7. The method of claim 1, further comprising:
receiving, through a second interface, the metrics from the plurality of physical hosts.

8. A non-transitory computer-readable storage medium having instructions that, when executed by a processing device, cause the processing device to:
receive, through a first interface, by the processing device, a rule for execution by a rules engine;
provide, by the processing device, the rule to a virtualization manager;
receive a request to provision a virtual machine (VM) having VM attributes;
determine, by the processing device, whether an instance of the rules engine is available;
in response to determining that an instance of the rules engine is available, establishing communication between the available instance of the rules engine and the virtualization manager;
in response to determining that no instance of the rules engine in available, initiating a new instance of the rules engine;
provide, by the processing device, the rule to the rules engine from the virtualization manager;
provide, by the processing device, metrics of a plurality of physical hosts to the rules engine and the VM attributes to the rules engine;
receive, from the rules engine, an identification of one or more prioritized physical hosts of the plurality of physical hosts; and
provision, by the processing device, the VM on one of the one or more prioritized physical hosts.

9. The non-transitory computer-readable storage medium of claim 8, wherein the received rule is a user-defined rule.

10. The non-transitory computer-readable storage medium of claim 8, wherein the processing device is further to:
generate a rules language file that incorporates the rule, wherein the rules language file is provided to the rules engine.

11. The non-transitory computer-readable storage medium of claim 10, wherein the rules language file is at least one of a Drools Rules Language file, an Extensible Markup Language file, a Business Rules Markup Language file, a C Language Integrated Production System file, an ILOG file, a Jess file, a Prolog file, a Lisp-based Intelligent Software Agents file, a Decision Table base Rules file, and an OpenL Tablets file.

12. The non-transitory computer-readable storage medium of claim 8, wherein the processing device is further to:
provide a plurality of sample rules to the virtualization manager via a user interface, each of the plurality of sample rules editable by an administrator of the virtualization manager.

13. The non-transitory computer-readable storage medium of claim 8, wherein the rules engine is a business rules engine to execute the rule using the metrics and the VM attributes.

14. The non-transitory computer-readable storage medium of claim 8, wherein the processing device is further to:
receive, through a second interface, the metrics from the plurality of physical hosts.

15. A computing device comprising:
a memory; and
a processing device operatively coupled to the memory, the processing device to:
receive a rule for execution by a rules engine;
provide the rule to a virtualization manager;
receive a request to provision a virtual machine (VM) having VM attributes;
determine whether an instance of the rules engine is available;
in response to determining that an instance of the rules engine is available, establishing communication between the available instance of the rules engine and the virtualization manager;
in response to determining that no instance of the rules engine in available, initiating a new instance of the rules engine;
provide the rule to the rules engine from the virtualization manager;
provide metrics of a plurality of physical hosts to the rules engine;
provide the VM attributes to the rules engine;
receive, from the rules engine, an identification of one or more prioritized physical hosts of the plurality of physical hosts; and
provision the VM on one of the one or more prioritized physical hosts.

16. The computing device of claim 15, wherein the received rule is a user-defined rule.

17. The computing device of claim 15, wherein the processing device is further to generate a rules language file that incorporates the rule, wherein the rules language file is provided to the rules engine.

18. The computing device of claim 15, wherein the processing device is further to:
provide a plurality of sample rules to the virtualization manager via a user interface, each of the plurality of sample rules editable by an administrator of the virtualization manager.

19. The computing device of claim 15, wherein the rules engine is a business rules engine to execute the rule using the metrics and the VM attributes.

20. The computing device of claim 15, wherein the processing device is further to: receive, through a second interface, the metrics from the plurality of physical hosts.

* * * * *